US012363490B2

(12) United States Patent
Solvang

(10) Patent No.: US 12,363,490 B2
(45) Date of Patent: Jul. 15, 2025

(54) SOUND FIELD MICROPHONES

(71) Applicant: Nomono AS, Trondheim (NO)

(72) Inventor: Audun Solvang, Trondheim (NO)

(73) Assignee: Nomono AS, Trondheim (NO)

( * ) Notice: Subject to any disclaimer, the term of this patent is extended or adjusted under 35 U.S.C. 154(b) by 84 days.

(21) Appl. No.: 17/802,376

(22) PCT Filed: Mar. 4, 2021

(86) PCT No.: PCT/NO2021/050057

§ 371 (c)(1),
(2) Date: Aug. 25, 2022

(87) PCT Pub. No.: WO2021/177838

PCT Pub. Date: Sep. 10, 2021

(65) Prior Publication Data

US 2023/0156419 A1 May 18, 2023

(30) Foreign Application Priority Data

Mar. 4, 2020 (GB) ...................................... 2003141

(51) Int. Cl.
*H04R 29/00* (2006.01)
*H04R 1/40* (2006.01)
(Continued)

(52) U.S. Cl.
CPC ........... *H04R 29/005* (2013.01); *H04R 1/406* (2013.01); *H04R 5/027* (2013.01); *H04S 3/008* (2013.01); *H04R 2430/20* (2013.01)

(58) Field of Classification Search
CPC ...... H04R 29/005; H04R 1/406; H04R 5/027; H04R 2430/20; H04S 3/008
(Continued)

(56) References Cited

U.S. PATENT DOCUMENTS 10,757,528 B1 * 8/2020 Mindlin .................. H04S 3/008
2003/0174852 A1 * 9/2003 Klinke .................. H04R 1/406
381/92
(Continued)

FOREIGN PATENT DOCUMENTS

JP 2017-530396 A 10/2017
JP 2018-511070 A 4/2018
(Continued)

OTHER PUBLICATIONS

International Search Report and Written Opinion issued in International Patent Application No. PCT/NO2021/050057 on Jun. 4, 2021.
(Continued)

*Primary Examiner* — William A Jerez Lora
(74) *Attorney, Agent, or Firm* — SHOOK, HARDY & BACON L.L.P.

(57) ABSTRACT

A microphone device comprises a microphone array comprising a plurality of microphone elements physically arranged to provide a respective plurality of microphone signals from which a spatially encoded sound-field signal may be produced; a local storage device; a processor; and a wireless transmission module. The device is arranged to store the plurality of microphone signals to the local storage device; to produce, using the processor, a reference signal including at least one of the plurality of microphone signals and a further signal derived therefrom; and to transmit the reference signal via the wireless transmission module.

23 Claims, 4 Drawing Sheets

(51) Int. Cl.
*H04R 5/027* (2006.01)
*H04S 3/00* (2006.01)

(58) Field of Classification Search
USPC ............................................. 381/1, 2, 91, 92
See application file for complete search history.

(56) References Cited

U.S. PATENT DOCUMENTS

| | | | | |
|---|---|---|---|---|
| 2005/0080616 | A1 | 4/2005 | Leung et al. | |
| 2005/0259832 | A1 | 11/2005 | Nakano | |
| 2013/0170666 | A1* | 7/2013 | Ng | H04R 29/006 381/92 |
| 2015/0071447 | A1* | 3/2015 | Sen | G10L 19/008 381/23 |
| 2016/0227340 | A1* | 8/2016 | Peters | H04S 3/008 |
| 2017/0287499 | A1 | 10/2017 | Duong et al. | |
| 2017/0311080 | A1 | 10/2017 | Kolb et al. | |
| 2018/0098174 | A1 | 4/2018 | Goodwin et al. | |
| 2018/0160251 | A1 | 6/2018 | Sanger et al. | |
| 2018/0206039 | A1* | 7/2018 | Vilermo | H04S 7/30 |
| 2019/0200156 | A1 | 6/2019 | Zhang et al. | |
| 2019/0327555 | A1* | 10/2019 | Chen | H04R 3/00 |

FOREIGN PATENT DOCUMENTS

| | | | |
|---|---|---|---|
| JP | 2020-501428 | A | 1/2020 |
| WO | 0171687 | A2 | 9/2001 |

OTHER PUBLICATIONS

Great Britain Search Report issued in corresponding Great Britain Patent Application No. 2003141.5 dated Sep. 3, 2020.

* cited by examiner

LEFT

FRONT

RIGHT

BACK

SOUND FIELD MICROPHONES

CROSS-REFERENCE TO RELATED APPLICATIONS

This application is a 35 U.S.C. § 371 National Phase of PCT Application No. PCT/NO2021/050057, filed Mar. 4, 2021, which claims priority to Great Britain Application No. 2003141.5, filed Mar. 4, 2020, the disclosures of each of which are incorporated herein by reference in their entirety.

TECHNICAL FIELD

The present invention relates to sound-field microphones, such as those suitable for use in sound-field recording systems and/or audio-object based productions.

BACKGROUND

Sound-field (also referred to as spatial audio) formats (e.g. Ambisonics, Dolby Atmos™, Auro-3D™, DTS:X™) provide a method of storing spatially encoded sound information relating to a given sound scene. In other words, they provide a way of assigning position information to sound sources within a sound scene to produce a spatially encoded soundtrack. In some productions, the sound information making up the spatially-encoded soundtrack is recorded separately (e.g. with separate conventional microphones), and position information for each sound source is then manually ascribed during post-production (e.g. when creating a computer generated video game sound scene). Alternatively, a spatially-encoded soundtrack may be captured partially or entirely live, e.g. using a multidirectional sound-field microphone array (e.g. an Ambisonic microphone array) which natively encodes captured audio with position/direction information. Capturing live "sound-field" data has been typically used to make conventional sound recordings more immersive (e.g. by creating the illusion of sitting amongst an orchestra), but more recently the technology has begun to be applied to other productions, such as virtual reality productions.

However, the Applicant has recognised that conventional sound-field microphone arrays are often complicated to set up and use, usually requiring several wired connections (e.g. to each component microphone) to a specially configured and/or dedicated multi-channel recorder capable of storing multiple audio channels simultaneously. The set-up and use of such microphone arrays can be cumbersome and unintuitive, especially to untrained users. The Applicant has recognised that an improved approach may be desired.

SUMMARY OF THE DISCLOSURE

According to a first aspect of the present invention there is provided a microphone device comprising a microphone array comprising a plurality of microphone elements physically arranged to provide a respective plurality of microphone signals from which a spatially encoded sound-field signal may be produced; a local storage device; a processor; and a wireless transmission module; wherein the device is arranged to store the plurality of microphone signals to the local storage device; to produce, using the processor, a reference signal including at least one of the plurality of microphone signals and a further signal derived therefrom; and to transmit the reference signal via the wireless transmission module.

Thus it will be seen by those skilled in the art that the microphone device provides a more practical solution to sound-field recording. A user can simply position the microphone device as required and be confident that the plurality of microphone signals needed to produce a spatially encoded sound-field signal are being stored without needing to undertake a time-consuming and complicated set-up procedure. At the same time, the transmission of the reference signal may enable the sound being captured by the microphone device to be conveniently stored, monitored, processed or analysed at a distance (e.g. on another device) without the need for a permanent wired connection to the microphone device.

The invention extends to a sound capture system comprising the microphone device as disclosed herein; and at least one further device comprising a wireless reception module arranged to receive the reference signal.

Because the at least one further device receives the reference signal via the wireless reception module (i.e. over a wireless link), its location may not be particularly restricted by the location of the microphone device. Whilst the position and/or orientation of the microphone device may need to be selected carefully to capture properly a sound scene with the microphone array, the at least one further device may not perform any audio capture and can therefore be positioned based on other considerations instead, such as ease of user access or proximity to a power source.

It will be appreciated that the reference signal transmitted by the microphone device thus may serve as a reference for the audio captured by the microphone array. The received signal may not contain all the information contained in the stored microphone signals, but preferably it will contain sufficient information to be a useful reference (e.g. for monitoring the recording and/or planning editing or post-processing decisions, as described in more detail below).

The at least one further device may comprise a storage device arranged to store the reference signal. This provides redundancy in case the signals stored on the local storage device are lost, but it may also be more convenient to provide greater storage capacity on a separate storage device than the local storage of the microphone device, allowing an increase in the quality and/or duration of audio that may be captured and stored.

The at least one further device may comprise a monitoring device for monitoring audio capture, arranged to reproduce the reference signal. For example, the monitoring device may be arranged to display a visual representation of the received signal(s) (e.g. as a waveform) or to relay the received signal(s) (or a version of the received signals) to a loudspeaker or headphones.

The at least one further device may comprise an editing device arranged to perform one or more editing processes on the reference signal. For example, the editing device may be arranged to perform processes such as selecting sequences for a final mix, equalisation (EQing), noise removal and/or compensation, downmixing (e.g. together with signals captured by other microphones) and annotation. This may allow a user to plan editing decisions in real-time, or at least before the (full quality) stored microphone signals are available to produce a full quality sound-field signal.

A single physical device (e.g. a tablet computer or a smartphone) may provide any combination of a storage device, a monitoring device and an editing device.

The at least one further device may comprise a base station. The base station may itself comprise a monitoring, editing and/or storage device but in some embodiments the base station comprises a networking device (i.e. a router) for facilitating communication between the microphone device and one or more other device(s) (e.g. a separate monitoring and/or editing and/or storage device).

The microphone device may be arranged to store to the local storage device an indication of the time or times at which the plurality of microphone signals were captured (i.e. to time-stamp the stored microphone signals). For example, the microphone device may comprise a clock module or a time code generator arranged to produce timing information and to store this information with the microphone signals (e.g. as metadata).

Similarly, the microphone device may be arranged to transmit the reference signal with corresponding timing information. In a set of preferred embodiments, the microphone device is arranged to store the microphone signals with timing information and to transmit the reference signal with timing information, to allow the two sets of signals to be synchronised subsequently more easily (e.g. in post-processing). For example, a user may perform one or more editing processes to a time-stamped reference sound-field signal (e.g. whilst audio recording is still ongoing). Subsequently, the same editing processes may be applied automatically to the stored microphone signals (or a high-quality sound-field signal derived therefrom) that have been synchronised to the reference signal using the timing information.

The microphone device may comprise a wired electrical connector (e.g. comprising one or more electrical contacts) such as a socket for a connection cable (e.g. a USB cable), or a connector suitable for direct connection (i.e. docking) to another device. The microphone device may be arranged to transmit the plurality of microphone signals via the wired electrical connector. The microphone device may be arranged to receive electrical power via the wired electrical connector (e.g. for charging a battery of the microphone device).

In some sets of embodiments, the at least one further device (e.g. a base station) also comprises a corresponding wired electrical connector, such that a temporary wired electrical connection may be formed between the microphone device and the at least one further device (e.g. once audio capture is complete). The wired electrical connector of the further device may comprise a socket to which a data and/or power cable may be connected. In some preferred embodiments, however, the wired electrical connector of the further device comprises a docking portion to which the microphone device may be connected directly (i.e. docked) to form the wired electrical connection.

The sound capture system may comprise a dock device (e.g. a dedicated dock device separate to the further device) with a wired electrical connector for charging and/or transferring data to and/or from the microphone device. The dock device may also be arranged to charge and/or transfer data to and/or from other devices such as the further device or other microphones. The dock device may therefore not need be adapted for wireless communication (e.g. for receiving the signal(s) transmitted from the wireless communication module of the microphone device) and may simply provide a convenient way to charge and/or transfer data to/from the wireless microphone(s) over a wired connection.

The microphone device and the at least one further device may be arranged to transfer the stored microphone signals from the storage device of the microphone device to the storage device of the at least one further device and/or to charge a battery of the microphone device via the temporary wired electrical connection. A temporary wired electrical connection to the microphone device may also be operable to synchronise the microphone device and the further device (i.e. to synchronise a clock module or time code generator of the microphone device with a clock module or a time code generator of the further device). For instance, the further device may be arranged to send periodically one or more a time synchronisation commands over the wired electrical connector to synchronise a clock module or a time-code generator of the microphone device.

In some embodiments, the microphone device may further comprise a wireless reception module (e.g., the microphone device may comprise a wireless transceiver). The microphone device may be arranged to receive, via the wireless reception module, one or more control signals for controlling one or more operational parameters of the microphone device. For example, control signals may be sent to the microphone device to control the quality with which the plurality of microphone signals are stored (e.g. a level of compression applied thereto); the starting and/or stopping of audio recordings; a gain to be applied to one or more microphone elements; and/or the quality, number and/or nature of signals to be transmitted via the wireless transmission module (e.g. which of the plurality of microphone signals to transmit).

In some embodiments the at least one further device (e.g. a monitoring device or a base station) is arranged to transmit one or more control signals to the microphone device. The control signals may be transmitted in response to user input or may be automatically generated. For example, the further device may be arranged to synchronise with the microphone device over a wireless connection by transmitting control signals to the microphone device (e.g. time synchronisation commands).

The microphone device may be arranged to store the plurality of microphone signals without any further processing (e.g. as Ambisonics A-format signals). Storing the raw output from the microphone elements maximises the flexibility with which the signals may be used subsequently, and may require little or no on-board processing power, allowing the cost, size and/or power consumption of the microphone device to be reduced. In some embodiments, however, the plurality of microphone signals may be subject to one or more processes prior to being stored (e.g. a data compression process to save storage space).

In some sets of embodiments, the microphone device is arranged to produce (e.g. using an on-board processor) a spatially encoded sound-field signal (e.g. in the Ambisonics B-format) using the plurality of microphone signals. The term "spatially encoded" is used herein to refer to data from which position information can be determined. This may comprise explicit position metadata stored alongside sound data, but should also understood to encompass data from which position information is recoverable, e.g. the known positions and/or directivity of the microphone elements alongside the microphone signals from said microphones. A spatially encoded sound-field signal may comprise a plurality of components. For example, a spatially encoded sound-field signal may comprise a decomposition of the sound scene into one or more spherical harmonic components, such as an omnidirectional component (e.g., a zeroth order Ambisonics B-format signal) and/or higher order directional components (e.g., a first order figure-of-eight Ambisonics B-format signal). As will be appreciated by those skilled in the art, a spherical harmonic decomposition is analogous to recording the sound field with a set of virtual microphones, each with unique directional patterns corresponding to the spatial weighting of the spherical harmonics basis functions.

A spatially encoded sound-field signal may be produced from microphone signals that sufficiently cover the sound scene (i.e. they capture audio from all the sound sources of interest within the sound scene) along with direction and position information about the microphone elements with which these signals are captured. The microphone array thus comprises any physical arrangement of microphone elements from which a spatially encoded sound-field signal may be generated, for example a planar array, an orthogonal array or more other (e.g. more complex) arrangements.

For example, a spatially encoded sound-field signal may be produced from as few as two microphone elements (e.g. arranged as a stereo pair), although this may have limited spatial resolution. In some embodiments additional information such as known physical limits to the position or movement of a sound source, or a known starting position used in conjunction with tracking techniques, may be utilised to improve or refine a spatially encoded sound-field signal. However, the Applicant has recognised that a more accurate and/or comprehensive (e.g. two- or three-dimensional) sound-field signal may be produced when the microphone array comprises three or more microphone elements (producing three or more corresponding microphone signals). For example, three directional microphone elements pointing along orthogonal axes may provide good coverage of a sound scene (e.g. in the horizontal plane). In some embodiments, the microphone array comprises at least four microphone elements, for full three-dimensional coverage.

The microphone array may comprise a plurality of identical microphone elements but, in some embodiments the microphone array may comprise two or more different types of microphone elements (e.g. with different directionalities, different sensitivities and/or different frequency responses). Preferably, the microphone elements are adjacent each other, although in general they could be spaced apart from each other. The microphone elements may be arranged mutually orthogonally, that is the respective axes for each microphone element that have the greatest response are mutually orthogonal to one another. In some embodiments the microphone array comprises four or more microphones, for instance a tetrahedral array of microphone elements.

In some sets of embodiments, the microphone device is arranged to produce a spatially-encoded sound-field signal comprising an omnidirectional component and at least one higher order component (e.g. a first order component). Preferably, the spatially encoded sound-field signal comprises an omnidirectional component and two first-order components associated with orthogonal directions and further preferably the spatially encoded sound-field signal comprises an omnidirectional component and three first-order components associated with mutually orthogonal directions. The microphone device may be arranged to store the spatially encoded sound-field signal to the local storage device.

In some embodiments, the microphone device is arranged to transmit at least one of the plurality of microphone signals via the wireless transmission module (e.g. in real time or near-real time). Whilst, in general, transmitting more information via the wireless transmission module (e.g. a greater number of microphone signals and/or higher quality signals) may improve the redundancy of the system or allow the audio captured by the microphone to be more accurately monitored or edited, the Applicant has recognised that in many scenarios transmitting only a sub-set of the microphone signals (or even just one microphone signal, such as the signal from an omnidirectional microphone element) may still be useful. Even though the transmitted signal(s) may not contain all the sound information captured by the microphone device it may still be useful as a live reference in many scenarios (e.g. to enable rough monitoring of the audio captured by the microphone device) and may require only a small amount of bandwidth and/or power to transmit.

It should be understood that where the term ‘real time or near real time’ is used herein, it should be understood that data corresponding to the captured audio is transmitted at the same average rate as it is captured. There may of course be a small time offset between capture and transmission.

In some embodiments, the microphone device is arranged to transmit a further signal derived from at least one of the plurality of microphone signals via the wireless transmission module (e.g. in real time or near-real time). The further signal may comprise a spatially encoded sound-field signal produced from the microphone signals (or a sub-set of the components of a spatially encoded sound-field signal).

For example, the further signal may comprise an omnidirectional component of a sound-field signal, as this may provide a reasonable indication of the sound scene being captured whilst minimising the processing power and transmission bandwidth required. Additionally or alternatively, the further signal may comprise a directional signal (e.g. an additional first order figure-of-eight or cardioid signal) of a spatially encoded sound field signal. In examples where the spatially encoded sound-field signal comprises two or three orthogonal directional first-order components (e.g. two or three first-order figure-of-eight components associated with mutually orthogonal directions), the further signal may comprise a directional signal, determined from the orthogonal components, pointing in a direction that is either predetermined or dynamically selected during use (e.g. via a control signal from a user). This may enable a user to monitor audio emanating from a particular direction or from a particular region of the sound-field. For example, the further signal may comprise a directional cardioid signal determined from an omnidirectional signal and a first-order figure-of-eight signal.

Thus, it will be realized that the further signal derived from at least one of the plurality of microphone signals may comprise an omnidirectional signal from an omnidirectional microphone, an omnidirectional signal component of the sound-field signal, a directional signal derived from the sound field signal, or any combination thereof, including a first order figure of eight signal or a cardioid signal.

The microphone device (e.g. the wireless transmission module) may be arranged to perform source coding (i.e. data compression) of the signal(s) before transmission, reducing the transmission bandwidth and/or power required.

The microphone device may be arranged to record audio (i.e. to store the plurality of microphone signals to the local storage device) continuously whilst it is provided with power. However, in some embodiments the microphone device may be arranged to start and/or stop a recording at particular times. For instance, the microphone device may comprise a physical control input (e.g. a switch or button) for controlling audio recording (e.g. a user may start or stop recording by pressing a record button on the microphone device). Additionally or alternatively, the microphone device may be arranged to start and/or stop recording in response to a control signal (e.g. sent from another device such as a monitoring device), or by automatic speech recognition or speech keyword detection (e.g. in response to recognition of a command phrase such as “start recording”).

In some embodiments, the microphone device may be arranged to automatically start an audio recording when a wired connection with the further device is broken (e.g., when the microphone device is undocked from a base station). Similarly, microphone device may be arranged to automatically stop an audio recording when a wired connection with the further device is created (e.g., when the microphone device is docked with a base station). The Applicant has recognised that this may be a particularly intuitive and convenient mechanism for starting and/or stopping a recording.

As mentioned above, real time (or near-real time) transmission of at least one of the microphone signals and/or a signal derived therefrom may enable live monitoring, storage and/or editing of the captured audio. However, the wireless transmission module may additionally or alternatively be arranged to transmit one or more of the stored microphone signals in non-real time (e.g. after audio capture is complete). Transmitting in non-real time may have lower bandwidth requirements because the transmission can extend over a longer time than the recording, meaning that a greater number of signals and/or higher quality signals may be transmitted. In some embodiments, the microphone device may be arranged to transmit the stored microphone signals via the wireless transmission module. This may be more convenient than downloading the microphone signals over a wired connection.

Transferring the stored microphone signals to the at least one further device (either by wired or wireless means) means that the original high-quality microphone signals produced by the microphone elements are available for further processing. For example, the at least one further device may be arranged to produce a spatially encoded sound-field signal using the plurality of microphone signals (e.g. that are received via the wired electrical connection). Because the microphone signals contain more information about the sound scene than the reference signal(s), the spatially encoded sound-field signal produced by the further device may be more comprehensive and/or of higher quality than a sound-field signal.

Furthermore, in embodiments featuring an editing device arranged to perform one or more editing processes on the received signal(s), the sound capture system may be arranged to perform subsequently one or more corresponding editing processes on the spatially encoded sound-field signal produced by the further device. A user may thus plan editing decisions in real-time (or at least before the microphone signals have been downloaded from the local storage of the microphone device) using the editing device, and then these edits may be automatically applied to the (full quality) sound-field signal produced after audio capture has finished.

In another aspect of the invention a method is provided for capturing a sound-field recording in a sound capture system with a microphone device and a further device, comprising obtaining a plurality of microphone signals from a microphone array comprising a plurality of microphone elements; storing the plurality of microphone signals to a local storage device in the microphone device; using a processor of the microphone device to produce a reference signal including at least one of the plurality of microphone signals and/or a further signal derived therefrom; and transmitting the reference signal from the microphone device to the further device using a wireless transmission module of the microphone device and a wireless reception module of the further device.

In some embodiments the method further includes performing, in the further device, at least one of: using a monitoring device to reproduce the reference signal, using an editing device to perform one or more editing processes on the reference signal, and transmitting a control signal from the further device to the microphone device.

Embodiments of the method may, where editing processes are performed on the reference signal, further comprise transferring the stored plurality of microphone signals from the microphone device to the further device; producing a second spatially encoded sound-field signal using the transferred plurality of microphone signals; and subsequent to performing one or more editing processes on the reference signal, performing one or more corresponding editing processes on the second spatially encoded sound-field signal.

In embodiments where control signals are transmitted to the microphone device, the method may further include receiving the control signal at the microphone device; and controlling one or more operational parameters of the microphone device in accordance with the received control signal. The one or more operational parameters may be chosen from the group consisting of: starting an audio recording, stopping an audio recording, the quality with which the plurality of microphone signals is stored, applying a gain to one or more microphone elements, the quality of the reference signal, the nature of the reference signal, and the direction of a directional component included in the reference signal.

Features of any aspect or embodiment described herein may, wherever appropriate, be applied to any other aspect or embodiment described herein. Where reference is made to different embodiments, it should be understood that these are not necessarily distinct but may overlap.

BRIEF DESCRIPTION OF THE DRAWINGS

One or more non-limiting examples will now be described, by way of example only, and with reference to the accompanying figures in which.

DETAILED DESCRIPTION

Figure 1:
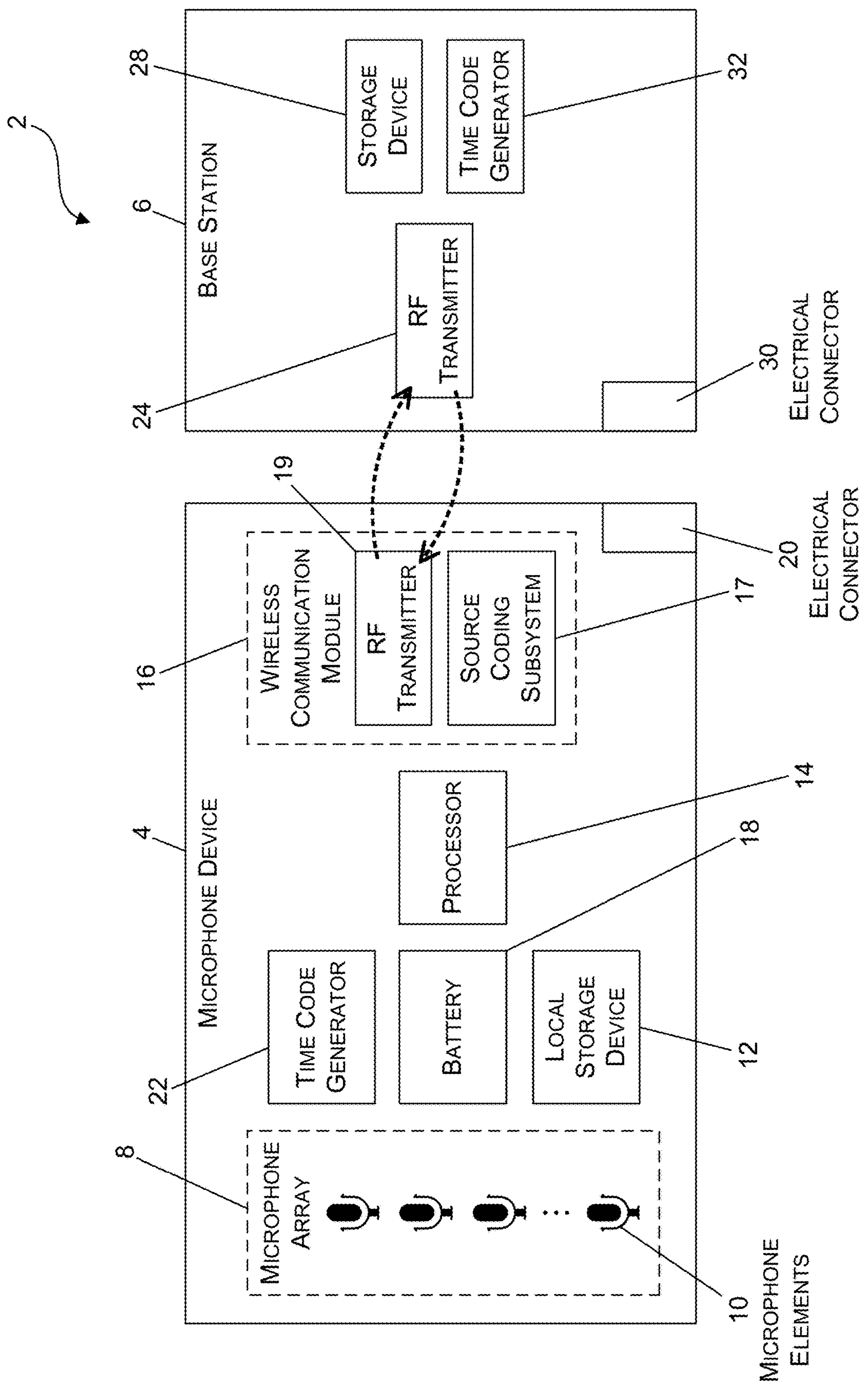
FIG. 1 is a schematic view of a sound capture system according to an embodiment of the present invention.

A sound capture system 2 according to an embodiment of the invention is shown in FIG. 1. The sound capture system 2 comprises a microphone device 4 and a base station 6.

The microphone device 4 comprises a microphone array 8 made up of M microphone elements 10, a local storage device 12, a processor 14, a wireless communication module 16, a battery 18, an electrical connector 20 and a time code generator 22.

The base station 6 comprises an RF transceiver 24, a storage device 28, an electrical connector 30 and a time code generator 32.

The microphone device 4 is operable to capture and record sound from its surroundings using the microphone array 8. During an audio recording, the M microphone elements 10 of the microphone array 8 produce M raw microphone signals (e.g. Ambisonic A-format signals). The microphone signals are stored at high quality (i.e. with a high bit rate and/or with little or no data compression) to the local storage device 12. The stored microphone signals are time-stamped using timing information produced by the time code generator 22.

The microphone signals are also passed to the processor 14, which uses the microphone signals and known positions and orientations of the microphone elements 10 to produce a spatially encoded sound-field signal (e.g. comprising a set of Ambisonic B-format components). The spatially encoded sound-field signal produced by the processor 14 may comprise, for example, a decomposition of the sound scene into spherical harmonic components. The sound-field signal is also time-stamped using timing information produced by the time code generator 22.

Figure 2:
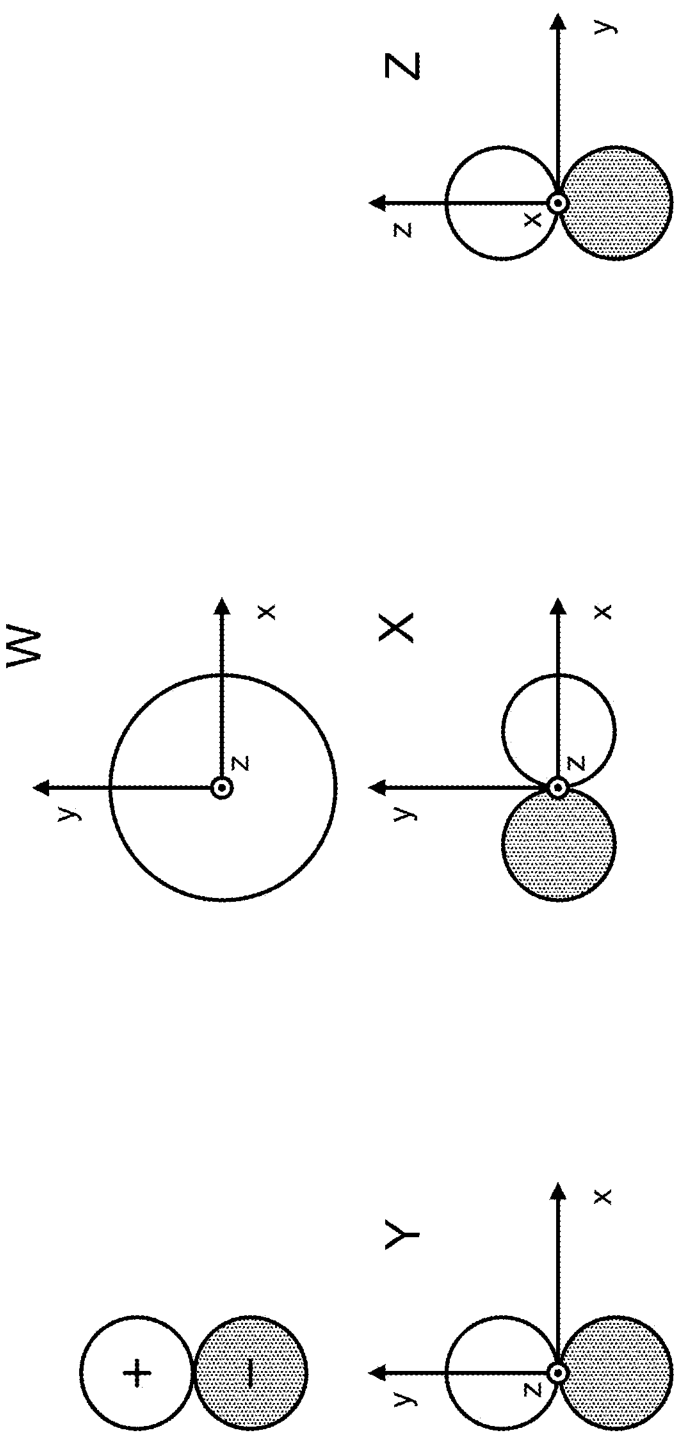
FIG. 2 illustrates zeroth- and first-order spherical harmonic components of an exemplary spatially encoded sound-field signal.

FIG. 2 illustrates an exemplary set of spherical harmonic components comprising a zeroth-order omnidirectional component W (i.e. the output of a virtual omnidirectional microphone) and with three first-order orthogonal figure-of-eight components (i.e. the outputs of three virtual orthogonal figure-of-eight microphone): an x-axis component X, a y-axis component Y and a z-axis component Z. The first-order components X, Y, Z, can be used to construct a directional figure-of-eight component oriented in an arbitrary direction (i.e. with azimuth θ and elevation φ) using the weighted sum: $X\cos(\theta)\cos(\varphi)+Y\sin(\theta)\cos(\varphi)+Z\sin(\varphi)$. A figure-of-eight component consists of two lobes, one with positive polarity and one with negative polarity, where sound arriving from the positive direction is recorded with a positive amplitude and sound arriving from the negative direction is recorded with a negative amplitude. In FIG. 2, the shaded lobe denotes negative polarity. For example, the microphone signals may be used by the processor 10 to produce a spatially encoded sound-field signal comprising an omnidirectional "mid" component and at least one figure-of-eight directional "side" component.

The sound-field signal produced by the processor 14 (or one or more components thereof, e.g. an omnidirectional component) is passed to the wireless transmission module 16 and transmitted to the base station 6 (i.e. to the RF transceiver 24 of the base station 6), where it is stored in the storage device 28. The wireless communication module 16 comprises a source coding subsystem 17, which applies source coding (i.e. data compression) to the time-stamped sound-field signal before it is transmitted via an RF transceiver 19. The source coding may be lossless or lossy.

The sound-field signal transmitted from the microphone device 24 to the base station 6 may then serve as a reference for monitoring and/or editing the audio recording in real time (or near-real time, when accounting for transmission and processing latencies). For example, one or more editing processes may be performed on the reference sound-field signal, such as selecting sequences for a final mix, equalisation (EQing), noise removal and/or compensation, downmixing (e.g. together with signals captured by other microphones) and annotation.

The editing processes can be manual (i.e. based on manual user input), fully automatic or a combination of manual and automatic. Although not illustrated in the Figures, the reference sound-field signal transmitted to the base station 6 may also be transmitted (wirelessly or by a wired connection) to other peripherals such as, but not limited to, PA systems, media recorders including audio recorders and cameras, local servers and cloud servers, media contribution and distribution systems.

The reference sound-field signal may not contain all the information about the sound scene contained in the raw microphone signals from the microphone elements 10. For example, the reference signal may not comprise a comprehensive sound-field signal (e.g. including only a sub-set of spherical harmonic components) and/or may be subject to data compression on transmission. However, in many situations this is acceptable because the complete set of high quality microphone signals is in any case retained in the local storage device 12 on the microphone device 4. The reference signal transmitted to the base station only needs to be of sufficient quality for monitoring and/or editing, with the full quality microphone signals stored on the microphone device 4 available to generate a high quality and comprehensive sound-field signal after recording has finished, as explained in more detail below.

Furthermore, because the transmitted reference sound-field signal and the stored microphone signals are both time-stamped, editing processes carried out on the reference signal can subsequently be applied automatically to a full-quality sound-field signal produced from the stored microphone signals during post processing.

Control signals may be sent from the RF transceiver 24 of the base station 6 to the RF transceiver 19 of the microphone device 4. For example, the base station 6 may send one or more control signals to the microphone device 4 to control aspects of audio capture such as starting and/or stopping of recording, or the quality and/or nature of the reference sound-field signal. The control signal(s) may be sent automatically and/or in response to user input to the base station 6.

Once audio recording is complete, the microphone device 4 is docked with the base station 6 such that the electrical connectors 20, 30 are brought into contact and a wired electrical connection between the microphone device 4 and the base station 6 is formed. The high quality microphone signals stored in the local storage portion 12 are downloaded to the base station 6. The microphone signals may then be used (e.g. by the base station 6 or a separate dedicated processing device) to produce a high-quality spatially encoded sound-field signal (e.g. comprising a complete set of spherical harmonic components). The wired electrical connection may also be used to charge the battery 18 of the microphone device and/or to synchronise the time code generators 22, 32.

In some scenarios, it may be convenient to transfer the stored microphone signals to the base station 6 over the wireless connection (i.e. via the RF transceivers 19, 24), as this does not require manual docking. For instance, the stored microphone signals may be transferred wirelessly in pauses during recording or at the end of recording.

A recording by the microphone device 24 may be initiated in several ways, for example: (1) via a control signal sent wirelessly to the microphone device 2 (e.g. from the base station 6 or another device); (2) triggered by the disconnection of the wired electrical connectors 20, 30 (e.g. as the microphone device 24 is removed from a docking portion of the base station 6 where the electrical connector 30 is provided); or (3) automatic speech recognition and speech keyword detection (e.g. by a microphone element 10 of the microphone device 24).

Similarly, a recording can be stopped in several ways, for example: (1) via a control signal sent wirelessly to the microphone device 24 (e.g. from the base station 6 or another device), (2) triggered by the connection of the wired electrical connectors 20, 30 (e.g. as the microphone device 24 is docked to a docking portion of the base station 6); or (3) automatic speech recognition and speech keyword detection.

Figure 3A:
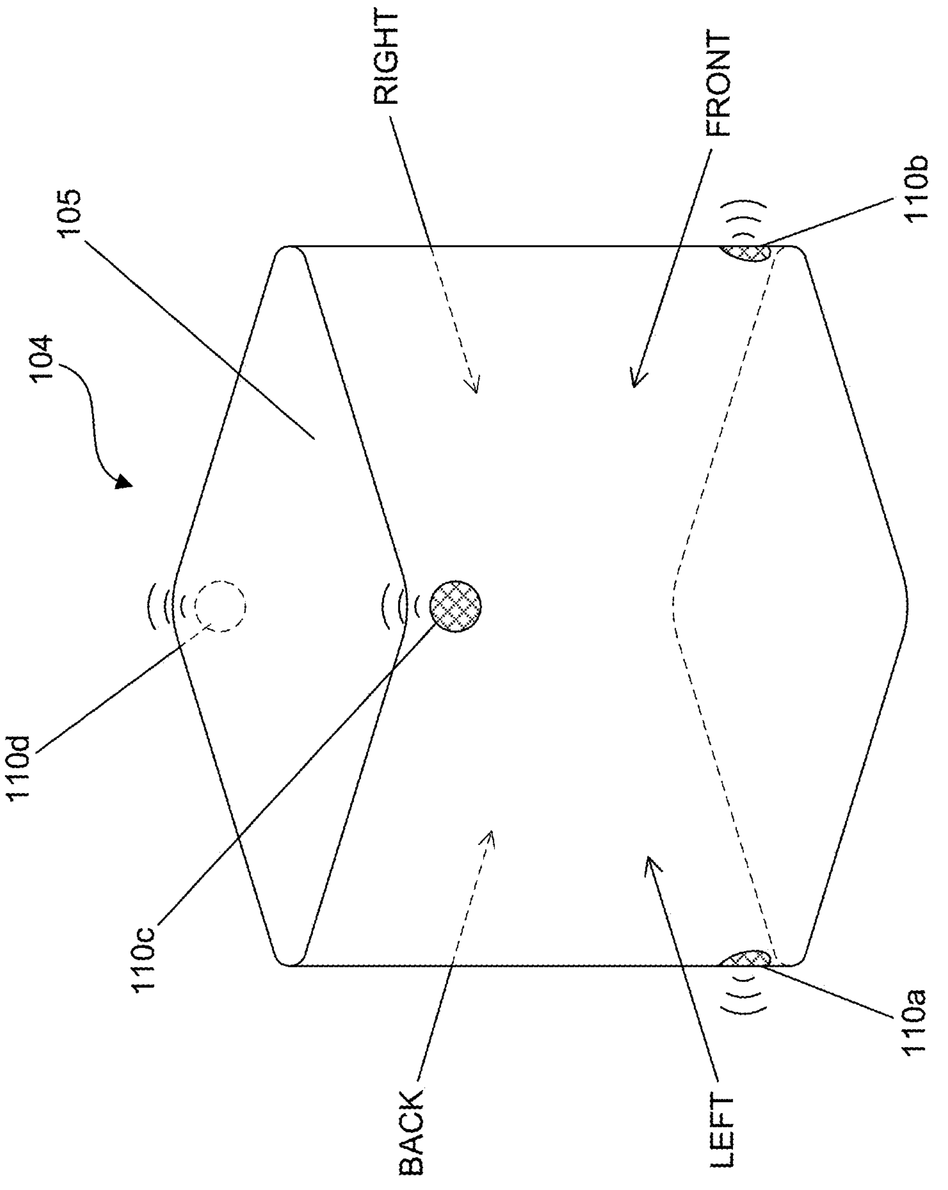
FIGS. 3*a*-3*e* show a microphone device according to an embodiment of the present invention.
Figure 3B:
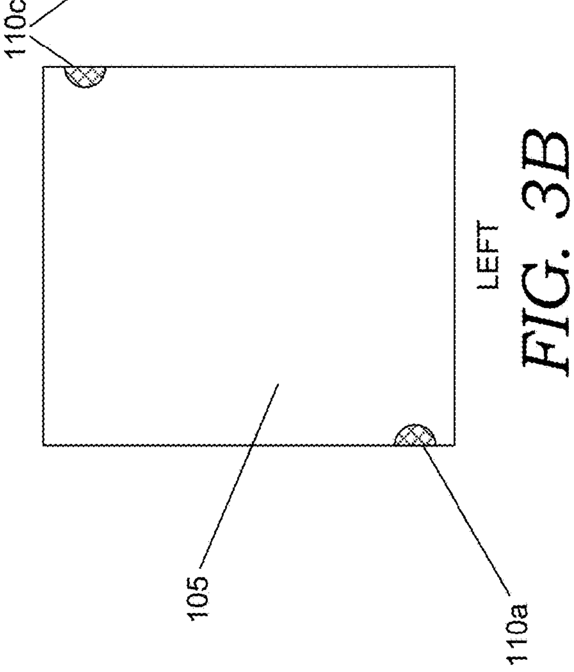
Figure 3C:
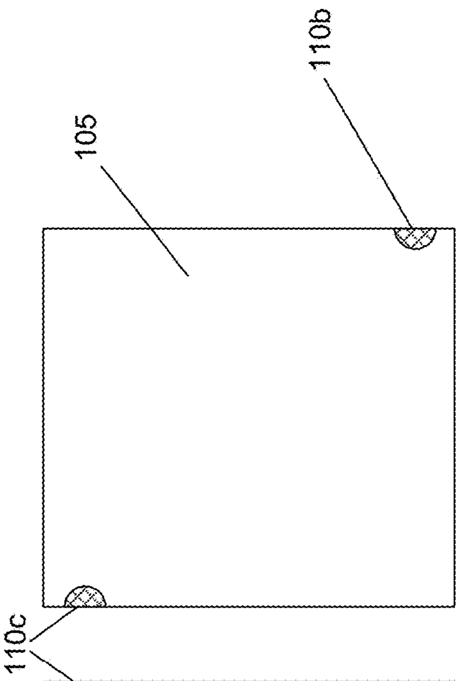
Figure 3D:
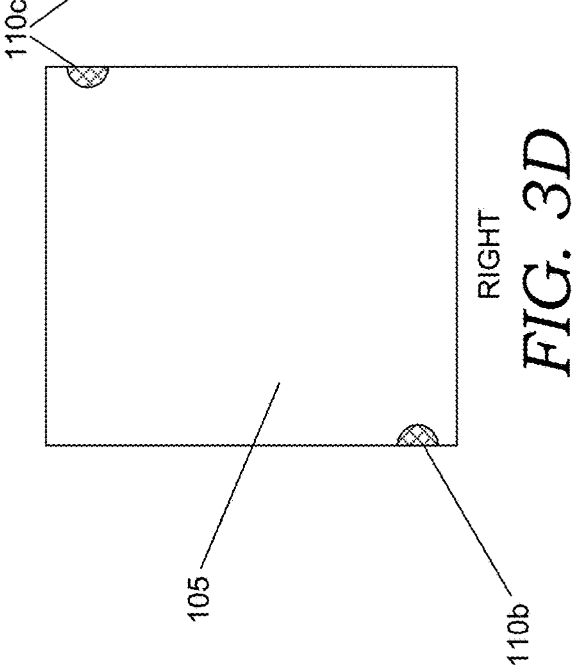
Figure 3E:
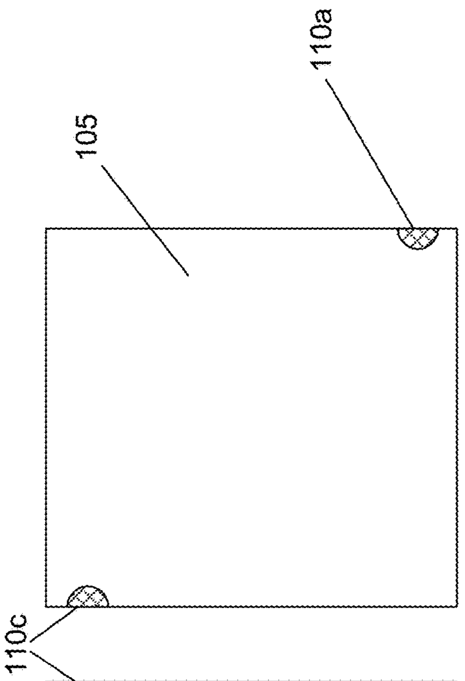

FIG. 3*a* is an isometric view of a microphone device 104 according to an embodiment of the invention. FIGS. 3*b*-3*e* are side views of the microphone device 104 from the left, front, right and back sides respectively (as indicated by the arrows in FIG. 3*a*).

The microphone device 104 comprises a cube-shaped housing 105 and a tetrahedral microphone array made up of four microphone elements 110*a*, 110*b*, 110*c*, 110*d* located at four corners of the cube-shaped housing 105.

The detailed description presented herein relies on embodiments of devices. It will be understood that these embodiments comprise active components that perform processes including such steps as recording, processing, transmitting, editing, determining, and controlling, the invention include aspects of methods being performed with or by the devices described. As such, this disclosure is also a disclosure of methods that are readily available to a skilled person and included in the appended claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A microphone device comprising:

a microphone array comprising a plurality of microphone elements physically arranged to provide a plurality of microphone signals from which a spatially encoded sound-field signal may be produced;

a local storage device;

a processor; and a wireless transmitter;

wherein the microphone device is arranged:

to record, by each of the plurality of microphone elements, a respective sound signal;

to store the respective sound signals to the local storage device;

to produce, while recording, using the processor, a reference signal, said reference signal derived from at least a subset of the respective sound signals;

to transmit, while recording, the reference signal via the wireless transmitter; and to transmit the stored plurality of sound signals or a plurality of signals derived from the stored sound signals via the wireless transmitter.

2. The microphone device of claim 1, wherein the processor is arranged to produce the spatially encoded sound-field signal using the plurality of microphone signals and include, in the reference signal, at least one component of the sound-field signal.

3. The microphone device of claim 2, wherein the at least one component of the sound-field signal is at least one of an omnidirectional component and one or more directional components.

4. The microphone device of claim 3, wherein the one or more directional components is, or is determined from, a first-order figure-of-eight component.

5. The microphone device of claim 3, wherein the one or more directional components are, or are determined from, two first-order figure-of-eight components associated with orthogonal directions.

6. The microphone device of claim 3, wherein the one or more directional components are, or are determined from, three first-order figure-of-eight components associated with mutually orthogonal directions.

7. The microphone device of claim 3, wherein the one or more directional components is a cardioid signal.

8. The microphone device of claim 2, wherein the microphone device is further arranged to store the spatially encoded sound-field signal to the local storage device.

9. The microphone device of claim 1, wherein the wireless transmitter includes an RF transceiver arranged to transmit the reference signal and receive a control signal, and the processor is further arranged to control one or more operational parameters of the microphone device in accordance with the control signal.

10. The microphone device of claim 9, wherein the one or more operational parameters are chosen from a group consisting of: starting an audio recording, stopping an audio recording, a quality with which the plurality of microphone signals is stored, applying a gain to one or more microphone elements, a quality of the reference signal, a nature of the reference signal, and a direction of a directional component included in the reference signal.

11. A sound capture system comprising:

the microphone device of claim 1; and at least one further device comprising a wireless receiver arranged to receive the reference signal.

12. The sound capture system of claim 11, wherein the at least one further device comprises a storage device arranged to store the reference signal.

13. The sound capture system of claim 11:

wherein the at least one further device comprises a monitoring device arranged to reproduce the reference signal.

14. The sound capture system of claim 11, wherein the at least one further device comprises an editing device arranged to perform one or more editing processes on the reference signal.

15. The sound capture system of claim 12, wherein the microphone device and the at least one further device are arranged to transfer the plurality of microphone signals from the local storage device of the microphone device to the storage device of the at least one further device.

16. The sound capture system of claim 15, wherein the at least one further device is arranged to produce a second spatially encoded sound-field signal using the plurality of microphone signals transferred from the microphone device.

17. The sound capture system of claim 16, comprising an editing device arranged to perform one or more editing processes on the reference signal; and wherein the sound capture system is arranged to perform subsequently one or more corresponding editing processes on the second spatially encoded sound-field signal.

18. The sound capture system of claim 11, wherein the at least one further device is arranged to transmit a control signal, automatically and/or in response to user input and using a transmitting capability of the wireless receiver, the control signal being configured to control one or more operational parameters of the microphone device.

19. A method of capturing a sound-field recording in a sound capture system with a microphone device and a further device, comprising:

recording, by each of a plurality of microphones in a microphone array, a respective sound signal;

storing the respective sound signals to a local storage device in the microphone device;

using a processor of the microphone device to produce, while recording the respective sound signals, a reference signal, said reference signal derived from at least a subset of the respective sound signals;

transmitting, while recording the respective sound signals, the reference signal from the microphone device to the further device using a wireless transmitter of the microphone device and a wireless receiver of the further device; and transmitting the stored plurality of sound signals or a plurality of signals derived from the stored sound signals via the wireless transmitter.

20. The method of claim 19, further comprising:

performing, in the further device, at least one of: using a monitoring device to reproduce the reference signal, using an editing device to perform one or more editing processes on the reference signal, and transmitting a control signal from the further device to the microphone device.

21. The method of claim 20, further comprising:

transferring the stored plurality of sound signals from the microphone device to the further device;

producing a second spatially encoded sound-held signal using the transferred plurality of microphone signals; and subsequent to performing the one or more editing processes on the reference signal, performing one or more corresponding editing processes on the second spatially encoded sound-field signal.

22. The method of claim 20, further comprising:

receiving the control signal at the microphone device; and controlling one or more operational parameters of the microphone device in accordance with the control signal.

23. The method of claim 22, wherein the one or more operational parameters are chosen from a group consisting of: starting an audio recording, stopping an audio recording, a quality with which the plurality of microphone signals is stored, applying a gain to one or more microphone elements, a quality of the reference signal, a nature of the reference signal, and a direction of a directional component included in the reference signal.

* * * * *